United States Patent Office 3,306,865
Patented Feb. 28, 1967

3,306,865
COMPOSITIONS PREPARED FROM CERTAIN SUBSTITUTED MELAMINES AND POLYAMIDES DERIVED FROM POLYMERIC FAT ACIDS
Donald H. Wheeler, Minneapolis, and Don E. Floyd, Robbinsdale, Minn., assignors to General Mills, Inc., a corporation of Delaware
No Drawing. Filed Sept. 6, 1962, Ser. No. 221,874
22 Claims. (Cl. 260—21)

The present invention relates to novel compositions of matter prepared from certain substituted melamines and polyamides derived from polymeric fat acids.

We have now discovered compositions of matter which are useful as coatings, adhesives, ink bases, in the preparation of laminates and the like. Such compositions are prepared from hexaalkoxyalkylmelamines and polyamides derived from polymeric fat acids. These new compositions are stable over long periods of time at room temperature but cure rapidly when heated to give tough, hard polymers. The long-term stability gives a distinct advantage over many other known compositions, such as mixtures of polyamides and epoxy resins, which have a relatively short pot-life. The cured products of our invention are light-colored and thus are superior to many other known systems—i.e., cured polyamide resin-phenolic resin systems, for example, give much darker films. The cured products have great flexibility, smoothness and strong adhesion to various substrates, particularly to metals. The compositions are also very versatile in permitting wide latitude in the ratio of reactants used, choice of solvent for formulation and selection of fillers and pigments or other modifying agents such as resins, waxes, plasticizers, accelerators and the like.

The substituted melamines which are used to prepare the compositions of the present invention have the following general formula:

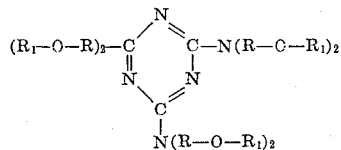

wherein R is a radical selected from the group consisting of —CH₂— and

and R₁ is a lower aliphatic radical having up to about 8 carbon atoms. Preferably R is —CH₂— and R₁ is an alkyl radical of from 1 to about 4 carbon atoms. It is especially preferred to use the substituted melamines wherein R₁ is the methyl radical.

The described melamines are prepared by well-known procedures. Thus, for example, the hexaalkoxymethylmelamines are prepared by reacting hexahydroxymethylmelamine with an excess of aliphatic alcohol in the presence of acid. The starting hexahydroxymethylmelamine is produced by the reaction of melamine with aqueous formaldehyde using an excess of formaldehyde over the theoretical ratio. In the preparation of the hexaalkoxyalkylmelamines, a mixture of substituted melamines may be produced—i.e., conversion of the hexahydroxyalkyl compound to the hexaalkoxyalkyl compound may yield a mixture containing mostly the hexaalkoxyalkyl compound, compounds containing less than six alkoxyalkyl substituents and some hydroxyalkyl substituents and some of the hexahydroxyalkyl starting material. Relatively pure hexaalkoxyalkylmelamines or mixtures rich in said reactants are preferred.

A wide variety of polyamides derived from polymeric fat acids can be used in the present invention. Resins of this general type are disclosed in Cowan et al. Patent 2,450,940. The typical of these polyamides are those made with polymeric fat acids and ethylene diamine and/or diethylene triamine. It is possible to produce polyamides having terminal amine groups or terminal carboxyl groups, or in which some of the terminal groups are amine groups while others are carboxyl groups. The latter polyamides can be termed neutral.

Polyamines which may be used to prepare the polyamides can be defined generally by the following structural formula, H₂NR′(NHR′)ₙNH₂ where R′ is preferably an alkylene radical containing less than about 5 carbon atoms and n is 0 or an integer from 1 to about 5. Illustrative of such polyamines are ethylene diamine, hexamethylene diamine, diethylene triamine, triethylene tetramine, and the like.

Various polymeric fat acids can be used to prepare the polyamides. The term "polymeric fat acid" refers to a polymerized fat acid. The term "fat acid" as used herein refers to naturally occurring and synthetic monobasic aliphatic acids having hydrocarbon chains of about 8–24 carbon atoms. The term "fat acids," therefore, includes saturated, ethylenically unsaturated and acetylenically unsaturated acids. These acids are generally polymerized by somewhat different techniques, but because of the functional similarity of the polymerization products, they are generally referred to as "polymeric fat acids." The polymeric fat acids usually contain a predominant portion of dimerized fat acids, a smaller quantity of trimerized and higher polymeric fat acids and some residual monomers.

Saturated fat acids are difficult to polymerize, but polymerization can be obtained at elevated temperatures with a peroxidic reagent such as di-t-butyl peroxide. Because of the low yields of polymeric products, these materials are not commercially significant. Suitable saturated fat acids include branched and straight chain acids such as caprylic acid, pelargonic acid, capric acid, lauric acid, myristic acid, palmitic acid, isopalmitic acid, stearic acid, arachidic acid, behenic acid and lignoceric acid.

The ethylenically unsautrated acids are much more readily polymerized. Catalytic or non-catalytic polymerization techniques can be employed. The non-catalytic polymerization generally requires a higher temperature. Suitable agents for the polymerization include acid or alkaline clays, di-t-butyl peroxide, boron trifluoride and other Lewis acids, anthraquinone, sulfur dioxide and the like. Suitable monomers include the branched and straight chain, poly- and mono-ethylenically unsaturated acids such as 3-octenoic acid, 11-dodecenoic acid, linderic acid, lauroleic acid, myristoleic acid, tsuzuic acid, palmitoleic acid, petroselinic acid, oleic acid, elaidic acid, vaccenic acid, gadoleic acid, cetoleic acid, nervonic acid, linoleic acid, linolenic acid, eleostearic acid, hiragonic acid, moroctic acid, timnodonic acid, eicosatetraenoic acid, nisinic acid, scoliodonic acid and chaulmoogric acid.

Acetylenically unsaturated fat acids, such as isanic and isanolic acids, can also be polyymerized to give polymeric acids which can be used. The acetylenically unsatuated acids occur only rarely in nature and are expensive to synthesize. Therefore, they are not currently of commerical significance.

Although any one of the above-described saturated, ethylenically unsaturated and acetylenically unsaturated fat acids may be used to prepare the polymeric fat acids, it is generally the practice in the art to polymerize mixtures of acids (or the simple aliphatic alcohol esters—i.e., the methyl esters) derived from the nautrally occurring drying and semi-drying oils. Suitable drying or semi-drying oils include soybean, linseed, tall, tung, perilla, oiticia, cottonseed, corn, sunflower, dehydrated castor oil and the like. Also, the most readily available acids are oleic and linoleic and thus they are preferred starting materials for the preparation of the polymeric fat acids. It is understood that relatively pure dimerized fat acids, trimerized fat acid, and higher polymers of fat acids may be used as well as mixtures thereof. The polymeric fat acids, as indicated above, may also contain residual monomeric fat acids, preferably less than about 20% by weight thereof.

The amidation reaction may be carried out under the usual conditions employed for this purpose. Polyamides of this type generally have molecular weights varying from about 1,000 to 10,000. The melting points vary depending upon the reactants and the reaction conditions. Where aliphatic diamines, such as ethylene diamine, are employed for the preparation of the polyamide, the resin may melt within the approximate range of about 100–120° C. and usually within the range of 100–105° C. Higher melting polyamide resins, for example those melting within the range of 130–215° C., may be made by employing a mixture of polymeric fat acids and other polybasic acids, the latter having at least two carboxyl groups which are separated by at least 3 and not more than 8 carbon atoms. Typical of these polybasic acids are the aliphatic acids, glutaric, adipic, pimelic, and sebacic; and the aromatic acids, terephthalic and isophthalic acids. Low melting polyamide resins, melting within the approximate range of about 10–90° C., may be prepared from polymeric fat acids and aliphatic polyamines having at least 3 atoms intervening between the amine groups principally involved in the amidation reaction. Typical of such polyamines are diethylene triamine, 1,3-diaminobutane, hexamethylene diamine and the like.

The preparation of the polyamide resins is further described in Renfrew et al. Patent 2,705,223; Peterson Patent 3,002,941; Bradley Patent 2,555,111; and Canadian Patent 574,166 to Peerman et al. These disclosures are incorporated herein by reference.

The curable compositions of the present invention are prepared by mixing the substituted melamines with the polyamides in the desired weight ratios. The amounts thereof can vary over relatively wide limits, it being only essential that enough substituted melamine is present to cure the polyamides to tough, hard polymers. Preferably, the weight ratio of the polyamides to the substituted melamines is in the range of about 1:1 to 10:1. A particularly preferred ratio is 2:1 to 8:1.

A solvent can also be used in the curable compositions. Examples of suitable solvents include alcohols, mono- and dialkyl ethers of glycols, aliphatic and aromatic hydrocarbons, chlorinated hydrocarbons and combinations of these solvents and others. Illustrative of such solvents are isopropanol, monoethyl ether of ethylene glycol, benzene, toluene, carbon tetrachloride, trichloroethylene, mixtures of isopropanol and toluene and the like. The solvent is used in an amount sufficient to dilute the polyamide-substituted melamine system to the desired degree and/or to facilitate the use of the curable composition as a coating material or the like. Obviously, the solvent can be used in widely varying amounts. Preferably, the solvent will be employed in an amount of 0.5 to 10 times the amount by weight of the polyamides and substituted melamines.

It is preferred to employ a catalyst to facilitate the subsequent curing with heat of the curable composition. Such catalyst or accelerator is preferably an organic acid. A representative compound is p-toluene sulfonic acid. The catalyst or accelerator is employed in an amount sufficient to increase the rate of cure of the curable composition. Amounts of about 0.05 to 2% by weight based on the weight of the polyamide and the substituted melamine give good results. The catalyst can be added along with or after the solvent, polyamide and/or the substituted melamine.

The cured composition or products of the present invention are prepared by heating the described polyamide-substituted melamine systems at temperatures high enough and for a sufficient length of time to produce hard, tough polymers. The temperature and heating period will vary over relatively wide limits depending on the polyamide and substituted melamine used, the presence or absence of solvent and/or catalyst, and the use intended. Preferably the curing is accomplished at temperatures of about 200–450° F. and times of about 10 minutes to 30 minutes or more.

Various addition agents can also be included in the compositions of the present invention. Fillers and pigments may be added as colorants, extenders and modifiers—i.e., for modifying coefficient of thermal expansion, electrical properties, water resistance and the like. Representative fillers are the amorphous silicas, natural silicates such as attapulgite and kaolin clays, amorphous alumina, talc and the like. Representative pigments include titanium dioxide, lead chromate, chromium oxide, ultramarine blue, red iron oxide and toluidine red.

Other additives include resins, waxes and plasticizers. Representative of said additives are chlorinated biphenyl, paraffin wax, rosin, stearic acid, and ortho and para N-ethyl toluene sulfonamide. All of these additives, as well as other known agents, can be added to the curable compositions at any point in the preparation thereof. Preferably, such additives are added after the admixture of the polyamide and the substituted melamine. The amounts thereof will vary with the properties desired in the finally cured polymer product.

As indicated hereinabove, the present invention also relates to the use of the polyamide-substituted melamine systems as coatings, adhesives, ink bases and in the preparation of laminates. The first step in any one of the described applications is a coating operation. Thus the curable compositions may be used to coat a wide variety of substrates, articles and materials. Such substrates, articles and materials may be composed of various metals such as steel, iron, tin, aluminum, copper, zinc and the like, as well as of alloys of said metals and of various non-metallic materials such as glass, plastics, ceramics, wood and the like. The articles to be coated may be plain, irregular or complex shaped. Thus, electrical insulators, bolts, pins, metal sheets, tubular sleeves, pipes, hooks, sieves, screens, fabrics, and innumerable other articles and materials of greater or lesser complexity of shape may be coated with our compositions.

The curable compositions are applied to the substrate surfaces, articles and materials by conventional procedures. They are applied, particularly in solution form, by brushing, spraying, roller coating, dipping, knife coating or other mechanical means. After application, the substrate, article or material is heated to cure the compositions to hard, tough polymers. The heating also serves to drive off the solvent when included therein.

When used as ink and paint bases, the compositions usually contain a pigment or colorant to give the desired color. Such use is essentially a coating operation with less than the total surface area of the substrate normally being coated. After application of the ink, the substrate is heated to cure the polyamide-substituted melamine system.

The compositions can also be used as adhesives for combining or bonding various substrate surfaces such as metal, paper, and plastic sheets. The curable compositions are applied to at least one sheet material and then, if desired, may be heated to effect partial cure. Such partial cure increases the tackiness of the composition. A second sheet material is then applied, followed by application of heat to cure or complete the cure of the polyamide-substituted melamine system.

Fibrous materials can be coated with our compositions and then used to prepare laminates. The fibrous materials can be natural or synthetic monofilaments, yarn, rovings or fabrics. Glass fibers are commonly used in the preparation of laminates. Said materials can be impregnated or coated by known methods such as, for example, dipping the same into a bath of the curable composition which preferably contains a solvent. The coated or impregnated fibrous material can be heated to at least partially drive off the solvent. Such materials can then be stored or subjected immediately to the laminating operation. The laminating can be accomplished by any of the well-known procedures.

The following examples are given by way of illustration and not in limitation.

Example I

To a solution of 11.7 g. hexamethoxymethylmelamine in 25 g. monoethyl ether of ethylene glycol was added 200 g. of a 60% by weight solution of a polyamide prepared from polymeric fat acids and diethylene triamine in a blend of xylol and monoethyl ether of ethylene glycol (9:1 volume ratio). The polyamide had an amine value of 83.0–93.0 (the amine value is the milligrams of KOH equivalent to base content of one gram of resin as determined by HCL titration), viscosity at 150° C. of 7.0–12.0 poises and a Gardner color of 8–12. The polymeric fat acids used to prepare the polyamide were derived from the mixture of acids in tall oil and contained about 70% dimeric fat acids, about 20% trimeric fat acids and about 10% monomeric fat acids. A clear solution was obtained.

Coating films of 1:5 mil thickness were cast on tin plates and baked at 450° F. for 5 minutes. The films were non-tacky, tough and hard. They passed the 60 inch-lb., Gardner reverse impact test successfully.

The clear solution, from which the films were cast, was unchanged after one month (observation thereof was discontinued after the one-month period). This example clearly demonstrates the stability of the polyamide-substituted melamine systems and the use thereof in the preparation of coatings.

Example II

A 10 g. portion of the polyamide used in Example I was warmed to soften it and was then dispersed by rapidly stirring it with a warm solution of 1 g. acetic acid in 75 ml. water. Two g. hexamethoxymethylmelamine was added to the dispersion and then films were cast on tin plates using a 1.5 mil blade. The films were baked for 10 minutes at 400° F. The baked coatings were non-tacky, moderately hard and very flexible. They withstood the 60 inch-lb. Gardner reverse impact tests.

Example III

To a solution of 20 g. of a polyamide prepared from ethylene diamine and polymeric fat acids in 30 ml. of an isopropanol-toluene mixture (1:1 volume ratio) were added 4 g. hexamethoxymethylmelamine and 0.25 g. p-toluene sulfonic acid. The polyamide had an amine value of 1.4–7.0, an acid value of 3.0 to 6.5, viscosity at 160° C. of about 15.0 poises and a Gardner color of about 10. It was prepared from the same polymeric fat acids as used to prepare the polyamide of Example I. A clear, curable solution was obtained.

Films were cast from the solution on tin-plates with a 3 mil blade and then the films were baked at 300° F. for 15 minutes. The baked coatings were clear, tough, and hard, with very little color. They had a pencil hardness of B and showed a 40% extension on the G.E. Impact-Flexibility Tester.

Example IV

A solution of 35 g. of a polyamide (similar to that used in Example III but having an acid value of 30.0–40.0) in 65 g. hot trichloroethylene was prepared and to it were added 8 g. hexamethoxymethylmelamine and 0.4 g. of a 20% solution of p-toluene sulfonic acid in isopropanol. The resulting solution was clear but fairly viscous. Films of 1.5 mil thickness were cast on tin-plates with a blade. They were then cured for 15 minutes at 300° F. The films showed very strong adhesion to the metal and were smooth, clear, glossy and of very light color. They had a pencil hardness of B, a Sward Hardness of 10, and an extensibility of 60+% as measured by the G.E. Impact-Flexibility Tester.

The clear solution was stored at 150° F. for over 12 days without change, thus indicating again the excellent stability of the curable compositions of the present invention.

It is to be understood that the invention is not to be limited to the exact details of operation or the exact compositions shown and described, as obvious modifications and equivalents will be apparent to those skilled in the art and the invention is to be limited only by the scope of the appended claims.

The embodiments of the invention in which an exclusive property or privilege is claimed are defined as follows:

1. A curable composition consisting essentially of:
   (1) a polyamide having a molecular weight of about 1000 to 10,000, said polyamide having been prepared by reacting under amidizing conditions (a) a polyamine having the formula $$H_2NR'(NHR')_nNH_2$$

where R' is selected from the group consisting of aromatic and aliphatic radicals and $n$ is an integer of from 0 to about 5 and (b) a polymeric fat acid having at least two carboxyl groups, said acid having been prepared by polymerizing monobasic aliphatic carboxylic acids of about 8–24 carbon atoms; and
   (2) at least one melamine having the general formula

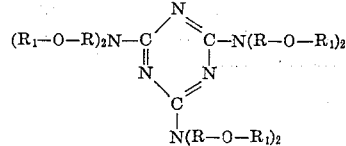

where R is a radical selected from the group consisting of the —$CH_2$— radical and the

radical and $R_1$ is an aliphatic radical having up to about 8 carbon atoms, said melamine being present in an amount sufficient to cure the said polyamide to a hard, tough polymer.

2. The composition of claim 1 wherein the weight ratio of the polyamide to melamine is in the range of about 10:1 to 1:1.

3. The composition of claim 1 which also contains a solvent.

4. The composition of claim 1 which also contains a catalyst.

5. The composition of claim 4 wherein the catalyst is an organic acid.

6. The composition of claim 5 wherein the organic acid is p-toluene sulfonic acid.

7. The composition of claim 1 which also contains an additive material selected from the group consisting of fillers, pigments, resins, waxes, plasticizers and mixtures thereof.

8. The composition of claim 1 where R' is an aliphatic radical.

9. The composition of claim 1 wherein R is —$CH_2$— and $R_1$ is an alkyl radical of 1 to about 4 carbon atoms.

10. The composition of claim 1 wherein the melamine is hexamethoxymethylmelamine.

11. The process of forming a film on a substrate comprising applying the composition of claim 1 to said substrate and then applying heat to at least partially cure the film.

12. The process of claim 11 wherein the film is applied to substantially all of the substrate surface.

13. The process of claim 11 wherein the heat is applied for a sufficient length of time to cure the film to a tough, hard polymer.

14. The process of claim 11 wherein the film contains a pigment and is applied to less than all of the substrate surface.

15. The process of claim 11 wherein the substrate is composed of a metal containing material.

16. The process of claim 11 wherein the substrate is composed of a fibrous material.

17. The process of claim 16 wherein the fibrous material having a film of the curable composition thereon is heated under laminating conditions to form a laminate.

18. The process of claim 11 wherein the substrate having the film of the curable composition thereon is contacted with a second substrate material to form a bond between said substrate materials.

19. The coated substrate prepared by the process of claim 11.

20. The bonded substrate material prepared by the process of claim 18.

21. A cured composition consisting essentially of the reaction product of (1) a polyamide having a molecular weight of about 1000 to 10,000, said polyamide having been prepared by reacting under amidizing conditions (a) a polyamine having the formula $$H_2NR'(NHR')_nNH_2$$

where $R'$ is selected from the group consisting of aromatic and aliphatic radicals and $n$ is an integer of from 0 to about 5 and (b) a polymeric fat acid having at least two carboxyl groups, said acid having been prepared by polymerizing monobasic aliphatic carboxylic acids of about 8–24 carbon atoms; and (2) at least one melamine having the general formula

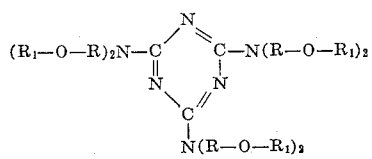

where R is a radical selected from the group consisting of the —$CH_2$— radical and the

radical and $R_1$ is an aliphatic radical having up to about 8 carbon atoms, said melamine being present in an amount sufficient to cure the said polyamide to a hard, tough polymer and said reaction product being prepared by heating the melamine and polyamide at temperatures high enough and for a sufficient length of time to produce a hard, tough polymer.

22. The composition of claim 21 wherein R is

—$CH_2$—

$R_1$ is an alkyl radical of 1 to about 4 carbon atoms, and $R'$ is an aliphatic radical.

References Cited by the Examiner

UNITED STATES PATENTS

| | | | |
|---|---|---|---|
| 2,357,273 | 8/1944 | Thurston | 260—21 |
| 2,450,940 | 10/1948 | Cowan et al. | 260—18 |
| 2,992,195 | 7/1961 | Young et al. | 260—18 |

OTHER REFERENCES

Zimmerman and Lavine: "Handbook of Material Trade Names," Supplement II to the 1953 edition, Industrial Research Service, Inc., Dover, New Hampshire, 1957, 356 pages (pages 65 and 66 relied upon).

Chemical and Engineering News, May 21, 1962, page 19.

LEON J. BERCOVITZ, *Primary Examiner.*

R. W. GRIFFIN, *Assistant Examiner.*